(12) United States Patent
Chen et al.

(10) Patent No.: US 6,441,950 B1
(45) Date of Patent: *Aug. 27, 2002

(54) DISTRIBUTED RAMAN AMPLIFIER SYSTEMS WITH TRANSIENT CONTROL

(75) Inventors: Chien-Jen Chen, Cupertino; William S. Wong, San Jose; Jun Ye, Palo Alto, all of CA (US)

(73) Assignee: Onetta, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/727,776

(22) Filed: Dec. 4, 2000

Related U.S. Application Data

(60) Provisional application No. 60/245,155, filed on Nov. 3, 2000.

(51) Int. Cl.[7] .............................................. H04B 10/12
(52) U.S. Cl. ..................... 359/334; 359/341.4; 359/177
(58) Field of Search ........................ 359/341.4, 341.41, 359/341.42, 333.2

(56) References Cited

U.S. PATENT DOCUMENTS

| | | | | |
|---|---|---|---|---|
| 4,881,790 A | | 11/1989 | Mollenhauer | 350/96.16 |
| 5,229,876 A | * | 7/1993 | Fatehi | 359/160 |
| 5,245,690 A | | 9/1993 | Aida et al. | 385/142 |
| 5,481,399 A | * | 1/1996 | Nagel | 359/341 |
| 5,513,029 A | | 4/1996 | Roberts | 359/177 |
| 5,623,508 A | | 4/1997 | Grubb et al. | 372/3 |
| 5,673,280 A | | 9/1997 | Grubb et al. | 372/3 |
| 5,703,711 A | * | 12/1997 | Hamada | 359/341 |
| 5,745,283 A | | 4/1998 | Inagaki et al. | 359/341 |
| 5,812,710 A | | 9/1998 | Sugaya | 385/27 |
| 5,900,969 A | | 5/1999 | Srivastava et al. | 359/341 |
| 5,959,750 A | | 9/1999 | Eskildsen et al. | 359/134 |
| 6,038,062 A | * | 3/2000 | Kosaka | 359/337 |
| 6,049,413 A | | 4/2000 | Taylor et al. | 359/337 |
| 6,052,393 A | | 4/2000 | Islam | 372/6 |
| 6,061,171 A | | 5/2000 | Taylor et al. | 359/341 |
| 6,091,541 A | * | 7/2000 | Yoon | 359/341 |
| 6,094,298 A | | 7/2000 | Luo et al. | 359/346 |

(List continued on next page.)

FOREIGN PATENT DOCUMENTS

| | | |
|---|---|---|
| EP | 0 734 105 A2 | 9/1996 |
| WO | WO 97/28584 | 8/1997 |
| WO | WO 99/66607 | 12/1999 |
| WO | WO 00/41346 A1 | 7/2000 |
| WO | WO 00/49721 | 8/2000 |
| WO | WO 00/73849 A1 | 12/2000 |

OTHER PUBLICATIONS www.photonics.com/dictionary/ "node" undated.*
Fukui, M. et al. "1580 nm Band All–Optial ADM Node Prototype Equipped with Fast Automatic Level Control." ECOC '98. Sep. 1998. pp. 571–572.*
Zhu et al. "1.28 Tbit/s (32×40 Gbit/s) Transmission over 1000 km NDSF Employing Distributed Raman Amplification and Active Gain Flattening" Electronics Letters, vol. 37, No. 1, p. 43–45 (Jan. 4, 2001).
Emori et al. "Cost–Effective Depolarization Diode Pump Unit Designed for C–band Flat Gain Raman Amplifiers to Control EDFA Gain Profile" p. 106–108.

(List continued on next page.)

Primary Examiner—Thomas H. Tarcza
Assistant Examiner—Andrew R. Sommer
(74) Attorney, Agent, or Firm—Fish & Neave; G. Victor Treyz

(57) ABSTRACT

Distributed Raman amplifier systems are provided in which gain transients are controlled. Signal taps may be used to monitor optical signal powers at network nodes. A telemetry channel may be used to share information between nodes. Information on the output power of a given node may be passed to a subsequent node using the telemetry channel. The subsequent node may use feed-forward and feedback control schemes to control Raman gain transients in the preceding transmission fiber span based on the output power information received over the telemetry channel.

1 Claim, 7 Drawing Sheets

U.S. PATENT DOCUMENTS

| | | | | |
|---|---|---|---|---|
| 6,111,687 A | * | 8/2000 | Tameda | 359/341 |
| 6,111,688 A | * | 8/2000 | Kobayashi | 359/341 |
| 6,115,174 A | | 9/2000 | Grubb et al. | 359/334 |
| 6,134,047 A | * | 10/2000 | Flood | 359/341 |
| 6,144,485 A | | 11/2000 | Sugaya et al. | 359/337 |
| 6,147,794 A | | 11/2000 | Stentz | 359/334 |
| 6,151,160 A | | 11/2000 | Ma et al. | 359/341 |
| 6,163,399 A | | 12/2000 | Berg | 359/341 |
| 6,163,636 A | | 12/2000 | Stentz et al. | 385/24 |
| 6,166,850 A | | 12/2000 | Roberts et al. | 359/341 |
| 6,178,038 B1 | | 1/2001 | Taylor et al. | 359/341 |
| 6,181,464 B1 | | 1/2001 | Kidorf et al. | 359/334 |
| 6,198,572 B1 | | 3/2001 | Sugaya et al. | 359/337 |
| 6,204,960 B1 | * | 3/2001 | Desurvire | 359/341 |
| 6,236,487 B1 | * | 5/2001 | Stephens | 359/161 |
| 6,236,499 B1 | | 5/2001 | Berg et al. | 359/341 |
| 6,275,313 B1 | | 8/2001 | Denkin et al. | 359/124 |
| 6,275,329 B1 | * | 8/2001 | Sieben | 359/337.13 |
| 6,275,331 B1 | * | 8/2001 | Jones | 359/341.44 |
| 6,282,017 B1 | * | 8/2001 | Kinoshita | 359/341.42 |
| 6,313,940 B1 | * | 11/2001 | Bode | 359/337 |

OTHER PUBLICATIONS

Takeda et al. "Active Gain Tilt Equalization by Preferentially 1.43µm–or 1.48µm–Pumped Raman Amplification" OSA Optical Amplifiers and their Applications, vol. 30, p. 101–105 (1999).

Masuda "Review of Wideband Hybrid Amplifiers" $25^{th}$ Optical Fiber Communication Conference, Technical Digest, p. 2–4, (Mar. 7, 2000).

Lewis et al. "Low–Noise High Gain Dispersion Compensating Broadband Raman Amplifier" $25^{th}$ Optical Fiber Communication Conference, Technical Digest, p. 5–7, (Mar. 7, 2000).

Fludger et al. "Inline Loopbacks for Improved OSNR and Reduced Double Rayleigh Scattering in Distributed Raman Amplifiers" OFC.

Stentz "Progress on Raman Amplifiers" OFC '97 Technical Digest, p. 343.

Hansen et al. "Raman Amplification for Loss Compensation in Dispersion Compensating Fibre Modules" Electronics Letters, vol. 34, No. 11, p. 1136–1137, May 28, 1998.

Emori et al. "Broadband Lossless DCF using Raman Amplification Pumped by Multichannel WDM Laser Diodes" Electronics Letters, vol. 34, No. 22, Oct. 29, 1998.

Neilson et al. "10 Gbit/s Repeaterless Transmission at 1.3 µm with 55.1–dB Power Budget using Raman Post and Preamplifier" OFC '98 Technical Digest, p. 52–53.

Sun et al. "Optical Fiber Amplifiers for WDM Optical Networks" Bell Labs Journal, p. 187–206, Jan.–Mar., 1999.

Nortel Networks Datasheet "MGM Multiwavelength Gain Module" (Nov. 3, 2000).

Ono et al. "Automatic Gain Control in Silica–Based EDFA with over 50nm Flat Gain Bandwidth using an all Optical Feedback Loop" $10^{th}$ Optical Amplifiers and their Applications Technical Digest, Jun. 9–11, 1999.

Kakui et al. "Dynamic–Gain–Tilt–Free Long–Wavelength Band Erbium Doped Fiber Amplifiers Utilizing Temperature Dependent Characteristics of Gain Spectrum" $25^{th}$ Optical Fiber Communication Conference, Technical Diges, p. 6–8, (Mar. 8, 2000).

Delavaque et al. "Gain Control in Erubium–Doped Fibre Amplifiers by Lasing at 1480nm With Photoinduced Bragg Gratings Written on Fibre Ends" Electronics Letters, vol. 29, No. 12, p. 1112–1114, Jun. 10, 1993.

Massicott et al. "1480nm Pumped Erbium Doped Fibre Amplifier with all Optical Automatic Gain" Electronics Letters, vol. 30, No. 12, p 962–964, Jun. 9, 1994.

Motoshima et al. "EDFA with Dynamic Gain Compensation for Multiwavelength Transmission Systems" OFC '94 Technical Digest, p. 191–192.

Zirngibl et al. "Gain Control in Erbium–Doped Fibre Amplifiers by an All Optical Feedback Loop" Electronics Letters, vol. 27. NO. 7, p. 560–561, Mar. 28, 1991.

Stentz et al. "Raman Amplifier with Improved System Performance" OFC '96 Technical Digest, p. 16–17.

* cited by examiner

US 6,441,950 B1

DISTRIBUTED RAMAN AMPLIFIER SYSTEMS WITH TRANSIENT CONTROL

This application claims the benefit of provisional application No. 60/245,155, filed Nov. 3, 2000.

BACKGROUND OF THE INVENTION

The present invention relates to fiber-optic communications networks, and more particularly, to distributed Raman-pumped optical amplifier systems with transient control capabilities for use in optical communications networks.

In optical networks that use wavelength division multiplexing, multiple wavelengths of light are used to support multiple communications channels on a single fiber. Optical amplifiers are used in such networks to amplify optical signals that have been subject to attenuation over multi-kilometer fiber-optic links. A typical amplifier may include erbium-doped fiber amplifier components that are pumped with diode lasers. Amplifiers have also been studied that use diode-laser pumping to generate gain through stimulated Raman scattering. Optical amplifiers based on erbium-doped fibers and Raman pumping increase the strength of the optical signals being transmitted over the fiber-optic links. A distributed Raman amplifier is a Raman amplifier in which optical amplification occurs in a span of Raman-pumped transmission fiber.

Sometimes channels in a communications link may be abruptly added or dropped. Channels may be dropped due to an accidental fiber cut. Channels may also be added or dropped suddenly due to a network reconfiguration. When the number of channels carried by a transmission fiber span changes abruptly, the total signal power being transported over the span changes suddenly. If a distributed Raman amplifier is pumped at a constant power, these sudden changes in signal power will result in transient effects in the gain of the distributed Raman amplifier. Gain transients in a distributed Raman amplifier may cause fluctuations in the power of the output signals from the amplifier. Output signals that are too weak may be difficult to detect without errors. Output signals that are too strong may give rise to nonlinear optical effects in fiber.

It is an object of the present invention to provide distributed Raman-pumped optical amplifier systems in which gain transients are controlled.

SUMMARY OF THE INVENTION

This and other objects of the invention are accomplished in accordance with the present invention by providing distributed Raman amplifier systems in which gain transients are controlled. Signal taps may be used to monitor optical signal powers at network nodes. A telemetry channel may be used to share information between nodes. Information on the output power of a given node may be passed to a subsequent node using the telemetry channel. The subsequent node may use feed-forward and feedback control schemes to control Raman gain transients in the preceding transmission fiber span based on the output power information received over the telemetry channel.

Each node in an optical communications link may include a rare-earth-doped fiber amplifier stage or other suitable amplifier for further amplifying optical signals that have been amplified by a distributed Raman amplifier. For example, erbium-doped fiber amplifiers may be used to amplify optical data signals before transmission to the next node in the link. Control electronics for erbium-doped fiber amplifier stages may be integrated with control electronics for distributed Raman amplifiers.

Signal taps in the erbium-doped fiber amplifier stages may be used to monitor input and output powers. Gain transients may be controlled in these fiber amplifier stages using feed-forward and feedback techniques.

Spectrum filters may be used for the power taps in the system to facilitate the use of feed-forward and feedback control techniques. For example, a spectrum filter may be used at the output of a given node. The spectrum filter may be used to impress the Raman gain spectrum of the following Raman-pumped transmission fiber span onto the measured output signal. Arrangements such as these allow feed-forward and feedback approaches to be used to control the Raman pump power for the span, even though the Raman gain spectrum is not flat. A combination of feed-forward and feedback techniques may be used to control amplifier transients in the distributed Raman amplifier if desired.

Further features of the invention and its nature and various advantages will be more apparent from the accompanying drawings and the following detailed description of the preferred embodiments.

DETAILED DESCRIPTION OF THE PREFERRED EMBODIMENTS

Figure 1:
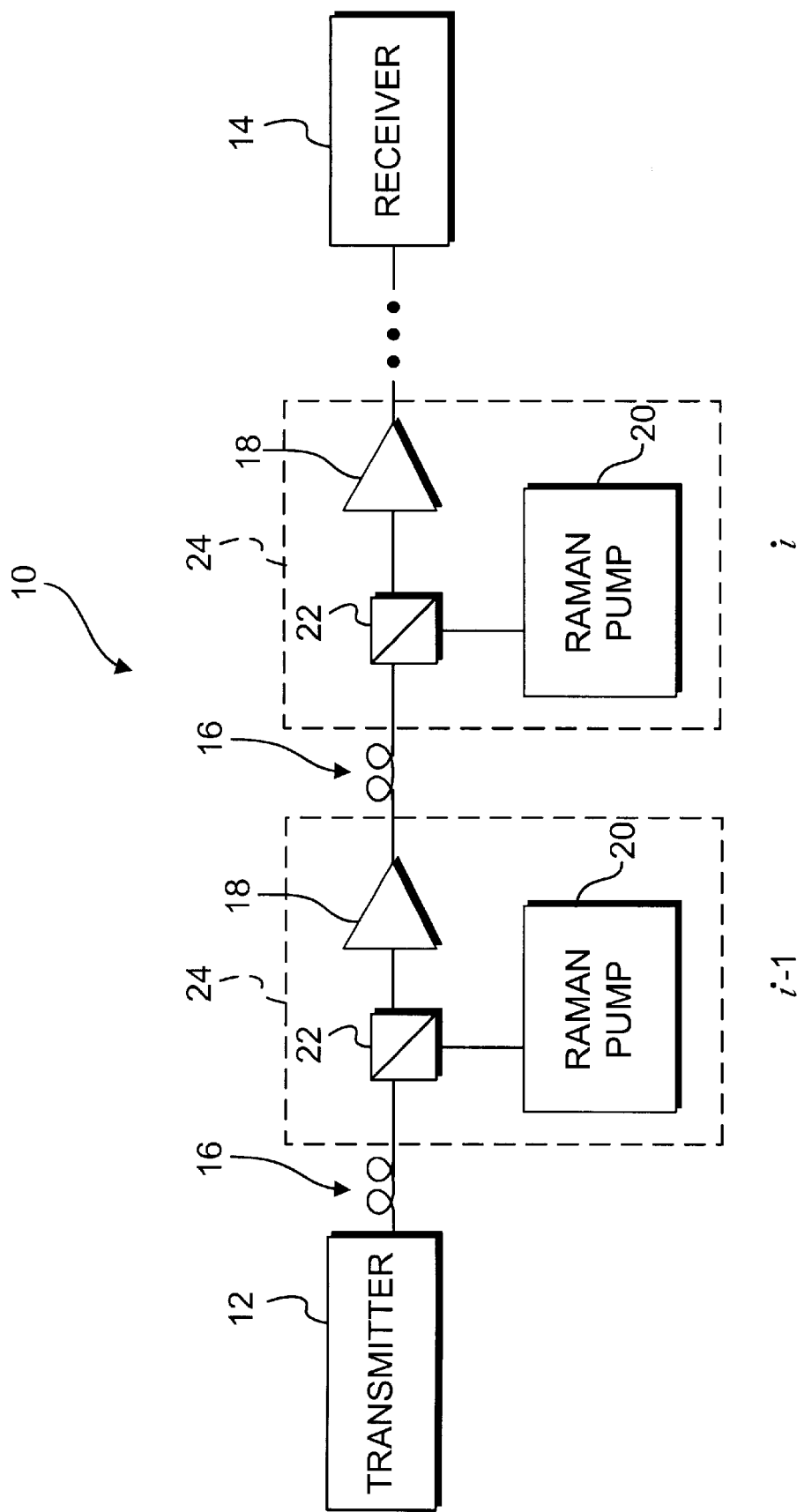
FIG. 1 is a schematic diagram of an illustrative optical communications link using optical amplifiers with transient control capabilities in accordance with the present invention.

An illustrative optical communications link 10 in accordance with the present invention is shown in FIG. 1. A transmitter 12 may transmit information to a receiver 14 over a series of fiber links. Each fiber link may include a span 16 of optical fiber. Fiber spans may be on the order of 40–160 km in length for long-haul networks or may be any other suitable length for use in signal transmission in an optical communications network.

The communications link of FIG. 1 may be used to support wavelength division multiplexing arrangements in which multiple communications channels are provided using multiple wavelengths of light. For example, the link of FIG. 1 may support a system with 40 channels, each using a different optical carrier wavelength. Optical channels may be modulated at, for example, approximately 10 Gbps (OC-192). The carrier wavelengths that are used may be in the vicinity of 1530–1560 nm. These are merely illustrative system characteristics. If desired, more channels may be provided (e.g., hundreds of channels), signals may be modulated at slower or faster data rates (e.g., at approximately 2.5 Gbps for OC-48 or at approximately 40 Gbps for OC-768), and different carrier wavelengths may be supported (e.g., wavelengths in the range of 1280–1625 nm).

Optical amplifier stages 18 may be used to amplify the optical signals between successive spans of fiber 16. Optical amplifier stages 18 may be based on one or more rare-earth-doped fiber or waveguide amplifier stages, Raman amplifier stages, semiconductor optical amplifier stages, parametric amplifier stages, or any suitable combination of such amplifier stages or other suitable amplifier stages. For purposes of illustration, the present invention will be described primarily in the context of amplifier stages 18 based on erbium-doped fiber amplifier stages. This is merely illustrative. Stages 18 may be any suitable optical amplifier stages suitable for amplifying optical signals on a fiber path in a fiber-optic communications link.

A distributed Raman amplifier arrangement may be used to produce optical gain for link 10. A distributed Raman amplifier uses a Raman pump to produce optical gain in a transmission fiber span through stimulated Raman scattering. Distributed Raman amplifiers provide distributed gain, because gain is provided in the transmission fiber span rather than in a discrete coil of Raman fiber at the pump source.

As shown in FIG. 1, distributed Raman amplifiers may use Raman pumps 20 to pump transmission fiber spans 16. Pump light from Raman pumps 20 may be coupled into spans 16 using pump couplers 22. Raman-pumping the transmission fiber spans 16 decreases attenuation losses in fiber spans 16.

Each node 24 in communications link 10 may have one or more distributed Raman amplifier pumps 20, pump couplers 22, and associated amplifier stages 18. If desired, each Raman pump 20 and associated amplifier stage 18 may be provided in a common amplifier housing. Each distributed Raman amplifier pump and associated amplifier stage 18 may also be packaged separately. If the distributed Raman amplifier components and the components of associated amplifier stages are provided as separate pieces of equipment, the pieces of equipment may be interconnected using any suitable electrical and optical communications paths. For clarity, the present invention is described primarily in the context of distributed Raman amplifier pumps 20 that are incorporated into the same equipment as the associated amplifier stages 18. This is, however, merely illustrative.

Figure 2:
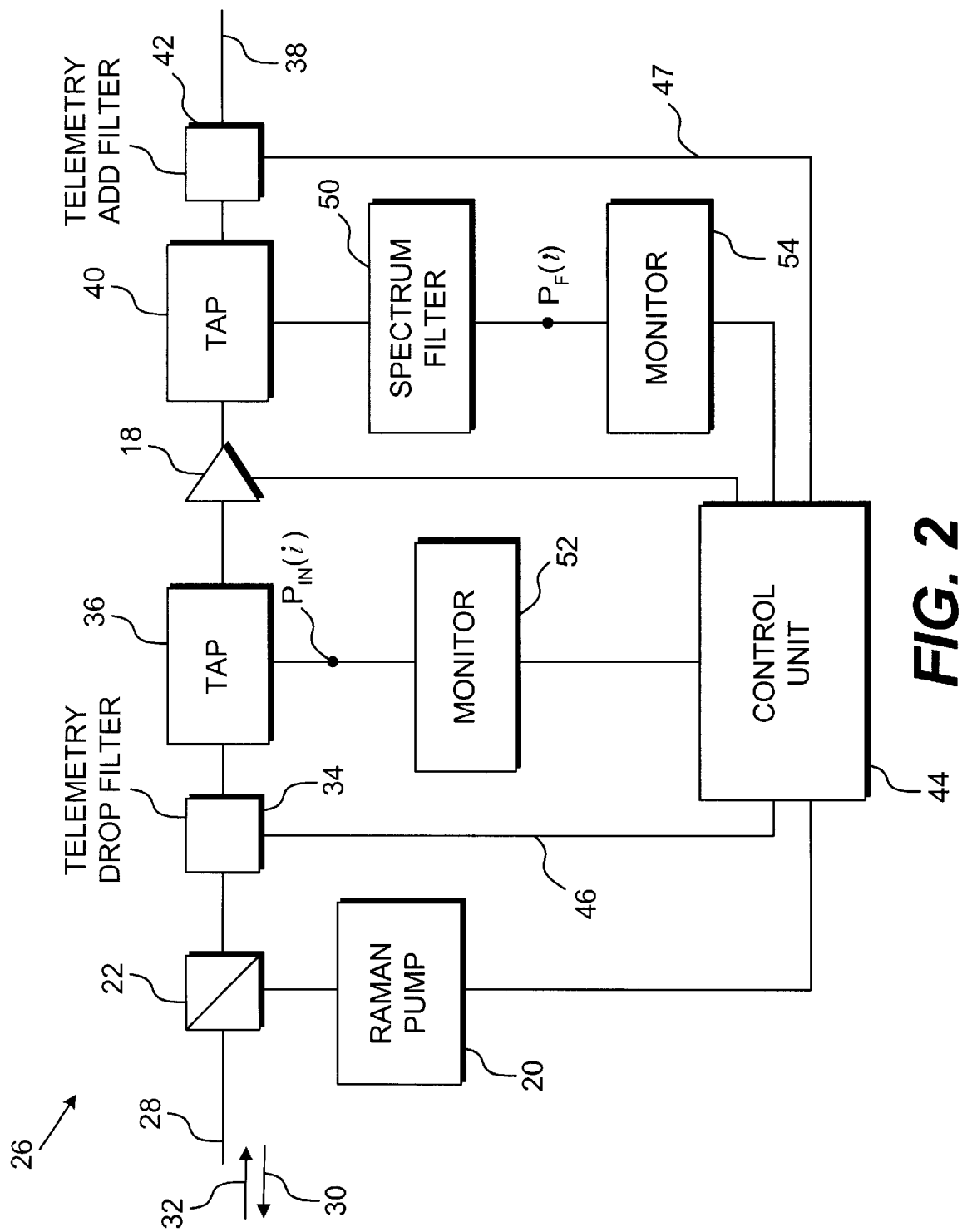
FIG. 2 is a schematic diagram of amplifier equipment at a communications link that includes a distributed Raman amplifier pump and an amplifier stage in accordance with the present invention.

Amplifier equipment 26 that includes a Raman pump 20 for a distributed Raman amplifier and that includes an associated amplifier stage 18 is shown in FIG. 2. Raman pump light from Raman pump 20 is coupled through pump coupler 22 to fiber input 28. Pump 20 may be any suitable source of pump light. For example, pump 20 may be one or more laser diodes operating in the vicinity of 1455 nm. Pump coupler 22 may be any suitable pump coupler such as a wavelength division multiplexing coupler. If desired, a circulator arrangement or other suitable pump coupling arrangement may be used to couple pump light from pump 20 into the main fiber path.

Fiber input 28 is coupled to the end of a transmission fiber span 16. Pump light from fiber 28 is transmitted in backwards direction 30 to pump the fiber span 16. Signals in that span are therefore amplified by Raman gain. The amplified optical signals from the fiber span enter equipment 26 at fiber 28 in forward direction 32.

Signals from fiber input 28 pass through pump coupler 22, telemetry drop filter 34, and tap 36 to amplifier stage 18. The signals are amplified by amplifier stage 18 and provided to output fiber 38 through tap 40 and telemetry add filter 42.

Telemetry drop filter 34 may be used to separate signals at a particular telemetry channel wavelength from the normal optical data signals that are provided to fiber 28 at other wavelengths. The separated telemetry channel optical signals may be provided to control unit 44 over fiber path 46. Control unit 44 may be based on any suitable control electronics such as one or more microprocessors, microcontrollers, digital signal processors, programmable logic devices, application-specific integrated circuits, etc. Control unit 44 may include receiver circuitry for receiving the telemetry channel signals from telemetry drop filter 34.

Control unit 44 may include transmitter circuitry for transmitting signals at the telemetry channel wavelength. These telemetry channel transmissions may be provided to telemetry add filter 42 over fiber path 47. Telemetry add filter 42 may be used to introduce the telemetry channel transmissions into the main fiber path.

If desired, telemetry channel communications may be supported using telemetry channel equipment that is partly or completely separate from equipment 26 and that is interconnected with equipment 26 using optical or electrical communications paths. With such an arrangement, equipment 26 may communicate over the telemetry channel using the separate telemetry channel equipment. For clarity, the present invention will be described in the context of amplifier equipment that supports telemetry channel communications internally. This is, however, merely illustrative.

Control unit 44 may monitor the optical signal power in the fiber path using taps such as taps 36 and 40. In the illustrative arrangement of FIG. 2, taps 36 and 40 may be 2%/98% wavelength-independent taps. One or both of the tapped signals may be spectrally-filtered. In the example of FIG. 2, the tapped output signal is filtered using spectrum filter 50. Monitors 52 and 54 may be used to convert optical signals from tap 36 and spectrum filter 50 in to electrical signals for processing by control unit 44. Monitors 52 and 54 may each have a photodetector for converting optical signals into current signals, a transimpedance amplifier for converting current signals from the photodetector into voltage signals, and an analog-to-digital converter for converting analog voltage signals from the transimpedance amplifier into digital signals for control unit 44. If desired, other suitable monitor circuits may be used.

Figure 3:
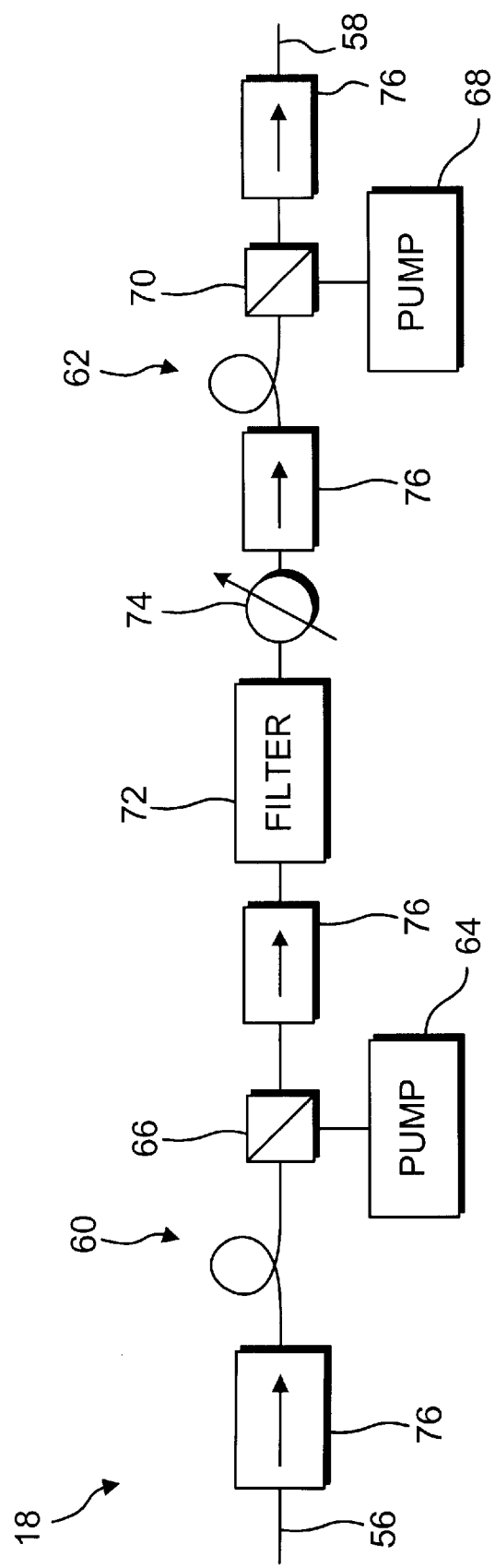
FIG. 3 is a schematic diagram of an illustrative rare-earth-doped fiber amplifier stage that may be used in the equipment of FIG. 2 in accordance with the present invention.

Amplifier stage 18 may be an erbium-doped fiber amplifier stage in which optical gain is provided by one, two, three, four, five, or more optically pumped erbium-doped fiber coils. An illustrative erbium-fiber amplifier stage 18 with two fiber coils is shown in FIG. 3. In stage 18 of FIG. 3, optical input signals from the main fiber path are provided to input 56 and amplified output signals for the main fiber path are provided at output 58.

Gain may be provided by erbium-doped fiber coils 60 and 62. Pump light for coil 60 may be provided using pump 64 and pump coupler 66. Pump light for coil 62 may be provided using pump 68 and pump coupler 70. Pumps 64 and 68 may be any suitable sources of pump light. For example, pumps 64 and 68 may be based on one or more laser diodes operating at 980 nm or 1480 nm.

Isolators such as isolators 76 may be used to reduce noise.

An optical filter such as filter 72 may be used to modify the spectral gain shape of amplifier 18. Variable optical attenuator 74 may be used to modify the amount of gain produced by amplifier stage 18 to accommodate signals with different input powers per channel. The arrangement of FIG. 3 is merely illustrative. Other configurations may be used to modify the gain settings and gain spectrum of amplifier stage 18 if desired. For example, a dynamically-adjustable spectral filter may be used.

Components such as pumps 64 and 68 and variable optical attenuator 74 may be controlled by control unit 44. For example, control unit 44 may control the amount of pump light produced by pumps 64 and 68 to control gain transients in amplifier stage 18. Any suitable system of optical taps and monitors may be used to gather input and output power information. This information may be processed by control unit 44 and the pumps adjusted accordingly in real time to prevent gain transients.

Figure 4:
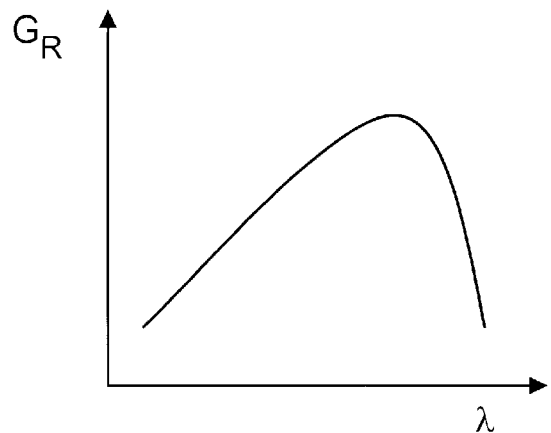
FIG. 4 is a graph showing an illustrative gain spectrum for a distributed Raman amplifier in accordance with the present invention.

An illustrative Raman gain spectrum that may be produced in the Raman fiber by Raman pumps 20 is shown in FIG. 4. Useful gain is typically exhibited throughout a range of approximately 30–130 nm above the pump wavelength. The wavelength of Raman pumps 20 may be selected so that the optical data signals being carried by the channels on link 10 of FIG. 1 fall within this range. In one suitable arrangement, the output power spectrum of each node 24 is flat. The output power for each channel with this arrangement is therefore the same at the output of each amplifier stage 18. Because the Raman gain in the transmission fiber has a gain spectrum of the type shown in FIG. 4, the data signals that are received at the input to amplifier stage 18 have a power spectrum that follows the gain spectrum of FIG. 4.

Because the Raman gain spectrum has a generally positive slope, amplifier stage 18 may be configured to have a gain spectrum with a negative slope. With this approach, the gain spectrum of the distributed Raman amplifier and the gain spectrum of amplifier 18 produce a flat gain spectrum when combined.

Figure 5:
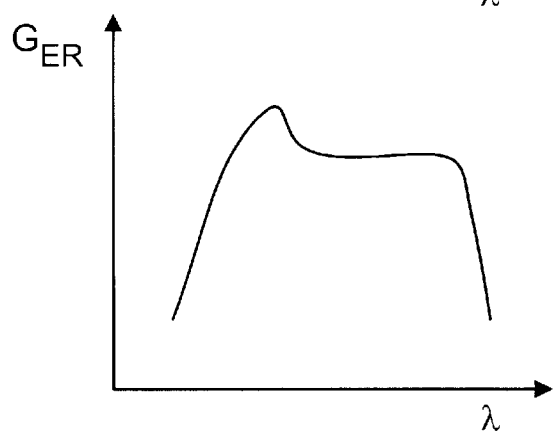
FIG. 5 is a graph showing an illustrative erbium-doped fiber gain spectrum for an illustrative erbium-doped fiber amplifier stage with transient control capabilities in accordance with the present invention.
Figure 6:
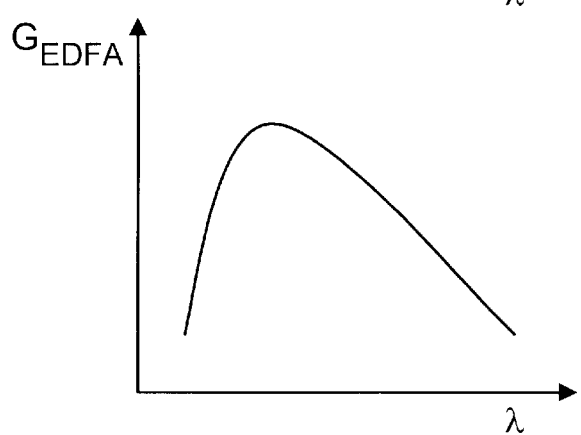
FIG. 6 is a graph showing an illustrative amplifier gain spectrum for an amplifier stage that may be used to amplify signals after they have been amplified by a distributed Raman amplifier stage in accordance with the present invention.
Figure 7:
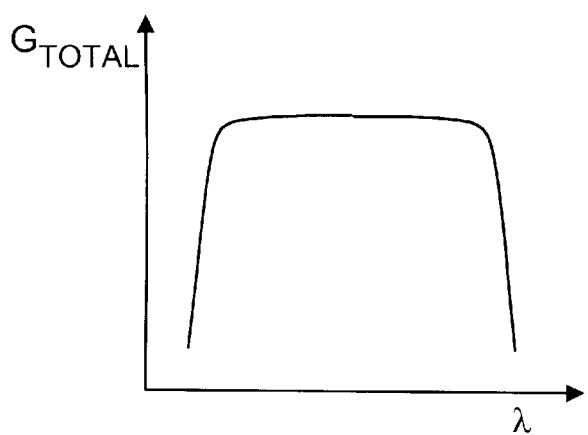
FIG. 7 is a graph showing an illustrative gain spectrum for a combined amplifier system using both a distributed Raman amplifier stage and an amplifier stage having a gain spectrum of the type shown in FIG. 6 in accordance with the present invention.

The erbium-doped fibers in amplifier stage 18 may have a gain spectrum of the type shown in FIG. 5. Filter 72 of FIG. 3 may be configured to modify the gain spectrum of FIG. 5 to produce a gain spectrum that compensates for the Raman gain spectrum of FIG. 4. An illustrative gain spectrum for amplifier stage 18 when a filter 72 of this type is used is shown in FIG. 6. A combined gain spectrum of the type that may be produced by the distributed Raman amplifier pumped by pump 20 of FIG. 2 and amplifier stage 18 of FIG. 2 is shown in FIG. 7. As shown in FIG. 7, the positive gain slope of FIG. 4 and the negative gain slope of FIG. 6 combine to form a flat gain spectrum for the overall amplifier system. With this type of arrangement, channels at different wavelengths that have equal powers are maintained at equal powers even after passing through several cascaded nodes.

Transmitter 12 of FIG. 1 may include laser diodes that each support a channel operating at a different wavelength. If one or more of these lasers is taken out of service or if new channels are added at transmitter 12, the number of wavelengths being transmitted across link 10 may change abruptly. The number of channels being carried by link 10 may also change due to unexpected system failures such as fiber cuts or may change when channels are added or dropped during system reconfigurations using add/drop modules.

When the number of channels being carried by link 10 changes abruptly, the total power that is supplied to the distributed Raman amplifier and amplifier stage 18 that are associated with a given node may change abruptly. Abrupt power changes of this sort may cause unacceptable transients in the power of individual signal channels at the output of the node. Link 10 must handle such transients, whether due to added channels or dropped channels, to ensure successful operation of the network.

A distributed Raman-pumped fiber amplifier with a constant pump level will not produce a well-controlled output signal in response to large variations in the input signal level. When the input power suddenly increases due to the addition of new channels, the Raman pump is depleted, which causes the output power per channel at the end of the pumped transmission fiber to decrease more than desired. When the input power suddenly decreases because channels have been dropped and the Raman pump level is not lowered accordingly, the Raman gain becomes too high and the output power per channel at the end of the pumped transmission fiber increases more than desired.

Control unit 44 may prevent these transient effects by adjusting the pump level of Raman pump 20 in real time. The distributed Raman-pumped fiber amplifier may be controlled using feed-forward approaches in which pump power is adjusted based on the measured input power to the amplifier. The "input" power for a distributed Raman amplifier that is pumped by a pump 20 at a given node in link 10 may be determined by measuring the output power of the previous node in the link. Feed-forward approaches may therefore be implemented in which the Raman pump power for each distributed Raman amplifier in a link is adjusted based on the measured output power from the amplifier equipment at a preceding node. Information on the measured output power at the preceding node may be provided to the next node over a telemetry channel.

The distributed Raman amplifier may also be controlled using feedback approaches in which the pump power for a Raman pump 20 is adjusted as needed to maintain the gain of the distributed Raman amplifier at a constant level. The gain of the distributed Raman amplifier may be measured by measuring the optical signal power before and after the Raman-pumped transmission fiber. The optical signal power before a given span of fiber may be measured by measuring the output power from the previous node. The optical signal power after a given span of fiber may be measured at the input to the node.

If desired, a hybrid scheme may be used that combines feed-forward and feedback control techniques.

The gain spectrum of a Raman-pumped transmission fiber span is not flat, as shown in FIG. 4. This may make it difficult to predict the desired Raman pump power to use for various different input power conditions. For example, the pump power that should be used when signals are received at one wavelength will generally be different than the pump power that should be used when signals are received at a different wavelength, even if the total signal power is the same. If the tapped input signals are not spectrally-filtered, it is not possible to properly discriminate between these different situations.

A spectrally-filtered power signal may be used to accurately predict the appropriate feed-forward pump power for a given Raman pump to use to pump an associated fiber span. In particular, a spectrum filter for the measured signal may be used that has a transmission spectrum that is directly proportional to the Raman gain spectrum of the Raman-pumped fiber. The spectrum filter impresses the spectral characteristics of the Raman-pumped fiber onto the power signals measured at the output of equipment 26, which allows the measured spectrally-filtered power at node i to be used in controlling the amplified power that is produced at the output of the fiber span 16 between node i and node i+1.

As shown in FIG. 2, the output power of amplifier stage 18 and equipment 26 at a given node i (i.e., the input power for the following span of transmission fiber) may be measured using tap 40, spectrum filter 50, and monitor 54. Tap 40 may be used to tap the output signal. Spectrum filter 50 in the equipment 26 at node i may be used to spectrally-filter the tapped signal to produce a spectrally-modified version of the tapped output power $P_F(i)$. The value of $P_F(i)$ may be transmitted to the control unit in node i+1 by control unit 44 in node i over the telemetry channel or other suitable communications path. This measurement may be used by control unit 44 in node i+1 to control the pump power at node i+1 using a feed-forward control scheme.

With one feed-forward approach for controlling gain transients, the feed-forward Raman pump power for Raman pump 20 at node i+1, $P_{PUMP-FF}(i+1)$, may be calculated based on the measured filtered power $P_F(i)$ at monitor 52 at node i, as shown in equation 1.

$$P_{PUMP-FF}(i+1)=f_1(P_F(i)) \quad (1)$$

The function $f_1$ may be determined experimentally or may be determined by modeling Raman pump behavior using the stimulated Raman scattering pump and depletion equations. In general, relatively modest changes in the pump power of the distributed Raman amplifier are sufficient to ensure that the gain of the amplifier is constant under a wide range of input powers.

Figure 8:
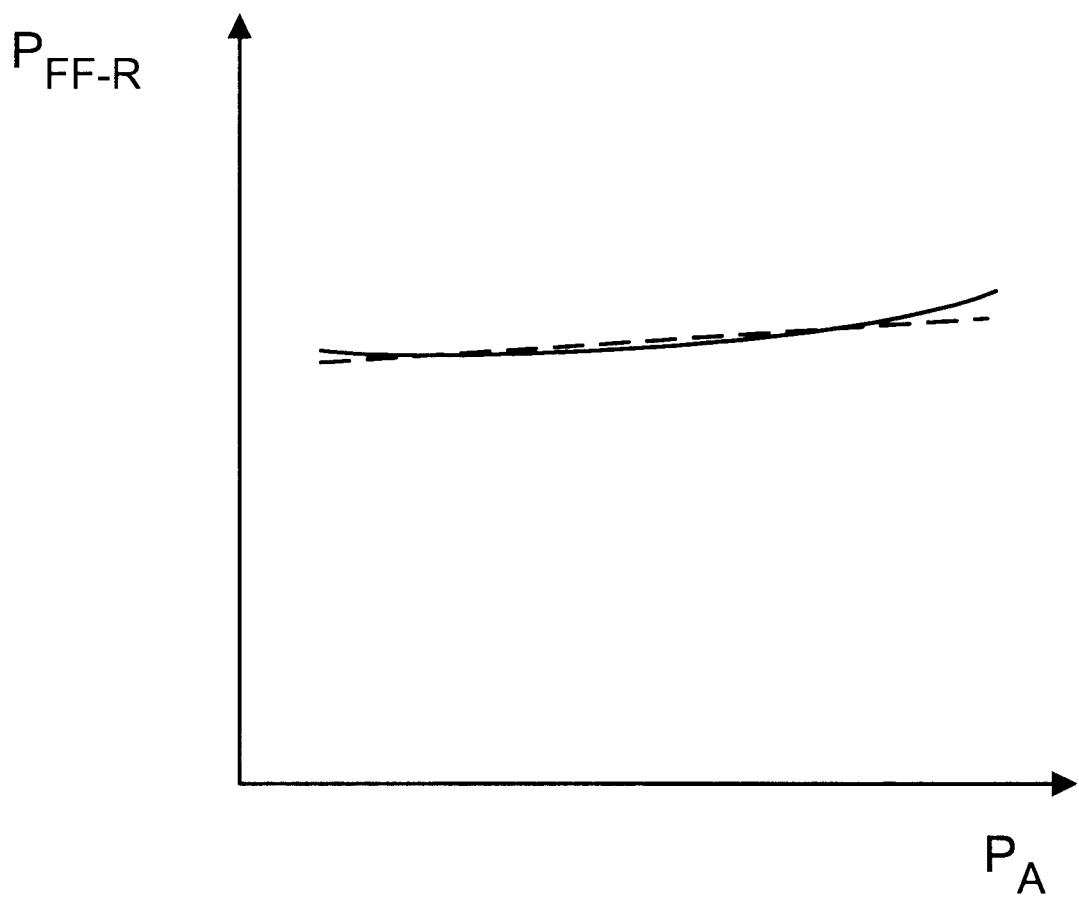
FIG. 8 is a graph showing the pump power that may be used to Raman pump a span of transmission fiber at various spectrally-modified measured power levels to control transients in accordance with the present invention.

An illustrative curve for function $f_1$ of equation 1 is shown by the solid line in the graph of FIG. 8. When control unit 44 at node i+1 detects a change in the power $P_F(i)$ at the output to the previous node, control unit 44 at node i+1 may direct pump 20 at node i+1 to change the pump power applied to the span of fiber 16 between node i and node i+1 according to equation 1. Equation 1 and other control equations used for controlling the optical pumping of the distributed Raman amplifier may be stored in a lookup table in control unit 44 or may be implemented by control unit 44 using any other suitable technique.

With the approach of equation 1, the power that is supplied to the Raman pump source 20 in equipment 26 at node i+1 may be determined based on the measured signal power $P_F(i)$ at the output to equipment 26 at the previous node. This allows the distributed Raman amplifier associated with node i+1 to respond to the change in the signal power at node i, even before the effect of this change is measured at equipment 26 of node i+1.

If desired, a linear approximation may be used for the function $f_1$. An illustrative linear approximation for equation 1 that may be used by control unit 44 at node i+1 when controlling Raman pump 20 at node i+1 for the span of fiber between node i and i+1 is given in equation 2 and is shown by the dotted line in the graph of FIG. 8.

$$P_{PUMP-FF}(i+1)=a\,P_F(i)+b \quad (2)$$

In equation 2, a and b are fitting parameters that may be determined experimentally. The functional form of equation 2 is merely illustrative. If desired, a simplified analytic form for equation 1 may be provided using second-order equations or higher-order equations or other suitable expressions.

By using a spectrum filter to modify the measured output signal from amplifier equipment 26 at node i, feed-forward control techniques may be used to reduce output power transients in the distributed Raman amplifier due to fluctuations in input power to the Raman-pumped fiber span. The spectral shape of spectrum filter 50 should be approximately or exactly matched to the spectral shape of the Raman-pumped transmission fiber span 16.

Feedback techniques may also be used to control gain transients in the distributed Raman amplifier. As shown in FIG. 4, the gain spectrum of the distributed Raman amplifier is not flat. Using input and output power measurements that have not been spectrally-filtered as the sole source of amplifier transient control feedback information in situations in which the gain of the amplifier is not flat may result in significant variations in the gain experienced on individual channels, which is generally unacceptable.

However, spectrum filter 50 has a spectrum that matches the Raman gain spectrum of the Raman pumped fiber span. Using spectrum filter 50 to make spectrally-modified power measurements effectively flattens the overall measured gain spectrum of the distributed Raman amplifier. If spectrum filter 50 is used in measuring the input power to a given Raman-pumped fiber span, an unfiltered monitor 52 may be used to measure the output power from the span. Using this filter arrangement or using any other suitable filter arrangement in which the ratio of the (filtered or unfiltered) output power from a given span to the (filtered or unfiltered) input power to the span is inversely proportional to the Raman gain spectrum allows feedback to be used to control gain transients based on a modified version of the distributed Raman amplifier gain. Maintaining the modified version of the amplifier gain at a constant level allows the non-flat gain of the distributed Raman amplifier to be stabilized, even when the amplifier is subjected to input power transients.

The modified version of the gain of the distributed Raman amplifier that is associated with a given node i+1 may be measured in real time by monitoring the spectrally-filtered output power $P_F(i)$ associated with node i and the unfiltered input power $P_{IN}(i+1)$ associated with node i+1. The spectrally-filtered power $P_F(i)$ at the output of node i may be measured using tap 40, spectrum filter 50, and monitor 54. (The transmission spectrum of spectrum filter 50 may be selected to match the Raman gain spectrum of the distributed Raman amplifier, so that the power $P_F(i)$ may also be used in equation 1 or 2 to calculate a feed-forward pump power contribution to a total pump power level for use in a hybrid control scheme). The input power $P_{IN}(i+1)$ to equipment 26 at node i+1 (i.e., the output power from the span of transmission fiber that is connected to the input of equipment 26 at node i+1 and that is pumped by the Raman pump 20 at node i+1) may be measured using tap 36 and monitor 52. If the output spectrum from node i is flat, the spectral components of $P_{IN}(i+1)$ will be proportional to the Raman gain spectrum. Accordingly, the ratio $P_{IN}(i+1)$ to $P_F(i)$ will be independent of the wavelengths of the channels being carried by the system.

This allows a modified gain parameter $G_{MODIFIED}$ that is given by the ratio of $P_{IN}(i+1)$ to $P_F(i)$ to be used to characterize the Raman-pumped fiber span between node i+1 and node i. The modified gain $G_{MODIFIED}$ may be calculated using equation 3.

$$G_{MODIFIED}(i+1)=P_{IN}(i+1)/P_F(i) \quad (3)$$

If desired, a spectrum filter may be used to filter the signal from tap 36, provided that the filter spectra in the system are selected so that the ratio of the filtered input power at node i+1 to the filtered or unfiltered output power at node i is not dependent on the wavelengths of the channels being carried by the system.

Once the modified gain has been determined using equation 3, the control unit 44 in node i+1 may be used to adjust the pump power of pump 20 ($P_{PUMP\text{-}FB}$) to maintain a constant level of $G_{MODIFIED}$. A gain error parameter may be calculated using equation 4.

$$E=G_{MODIFIED}-G_{DESIRED} \quad (4)$$

In equation 4, $G_{DESIRED}$ is the desired (constant) modified gain parameter for the distributed Raman amplifier and E is the gain error parameter. The gain error parameter E may be used by control unit 44 of node i+1 to calculate the feedback pump power $P_{PUMP\text{-}FB}$ for pump 20 to apply to the span of transmission fiber 16 between node i+1 and node i as shown in equation 5.

$$P_{PUMP\text{-}FB}=\alpha E+\beta \int E+\gamma E' \quad (5)$$

In equation 5, $\alpha$, $\beta$, and $\gamma$ are fitting parameters that may be determined experimentally. Equation 5 is based on the proportional-integral-derivative (PID) method. This is merely an illustrative feedback control technique that may be used. Any other suitable feedback technique may be used to calculate the pump power if desired.

If desired, a hybrid control scheme may be used that involves combining feed-forward control schemes such as those described in connection with equations 1 and 2 with feedback control schemes such as those described in connection with equations 3–5.

For example, control unit 44 at node i+1 may process information on power $P_F(i)$ to calculate a feed-forward pump contribution $P_{PUMP\text{-}FF}$ using equation 1 or 2. Control unit 44 at node i+1 may also process information on power $P_{IN}(i+1)$ and information on power $P_F(i)$ to calculate a feedback pump contribution $P_{PUMP\text{-}FB}$ using equations 3–5. These contributions to the calculated pump power for the amplifier may be combined using any suitable combining function g, as set forth in equation 6.

$$P_{PUMP}=g(P_{PUMP\text{-}FF}, P_{PUMP\text{-}FB}) \quad (6)$$

As an example, $P_{PUMP}$ may be calculated by linearly combining $P_{PUMP\text{-}FF}$ and $P_{PUMP\text{-}FB}$ as set forth in equation 7.

$$P_{PUMP}=P_{PUMP\text{-}FF}+P_{PUMP\text{-}FB} \quad (7)$$

An advantage of using a hybrid control scheme such as this is that it may allow transients to be controlled more accurately than would be possible using a less sophisticated control scheme. For example, the feed-forward contribution in the hybrid control scheme may allow the distributed Raman amplifier to respond relatively quickly to input power variations and the feedback contribution in the hybrid control scheme may allow the distributed Raman amplifier to correct for gain drift arising from fiber and component aging and to correct for inaccuracies in the feed-forward control contribution.

Figure 9:
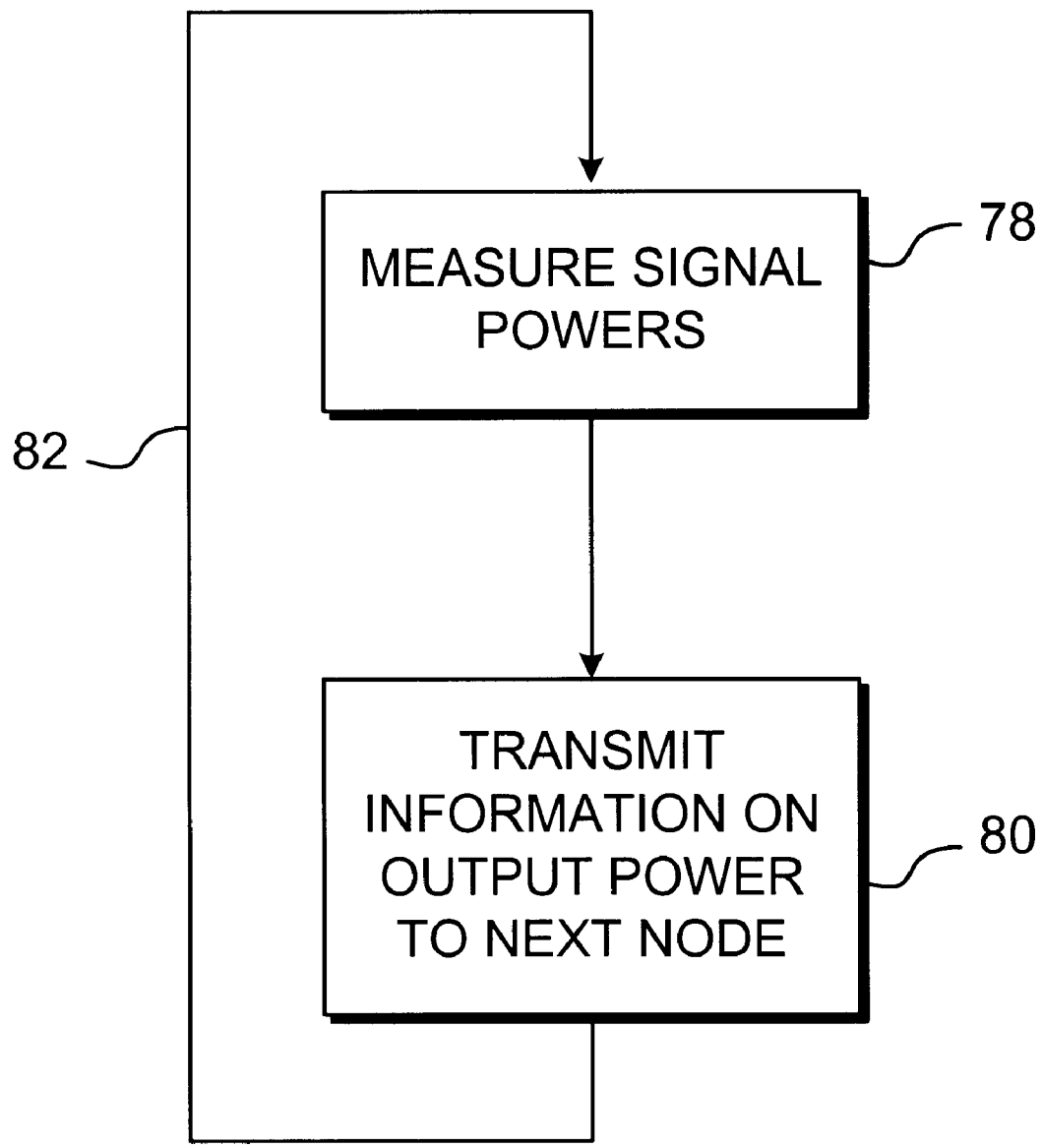
FIG. 9 is a flow chart of illustrative steps involved in measuring signal powers for use in controlling the pumping of distributed Raman amplifiers to reduce transient effects in accordance with the present invention.
Figure 10:
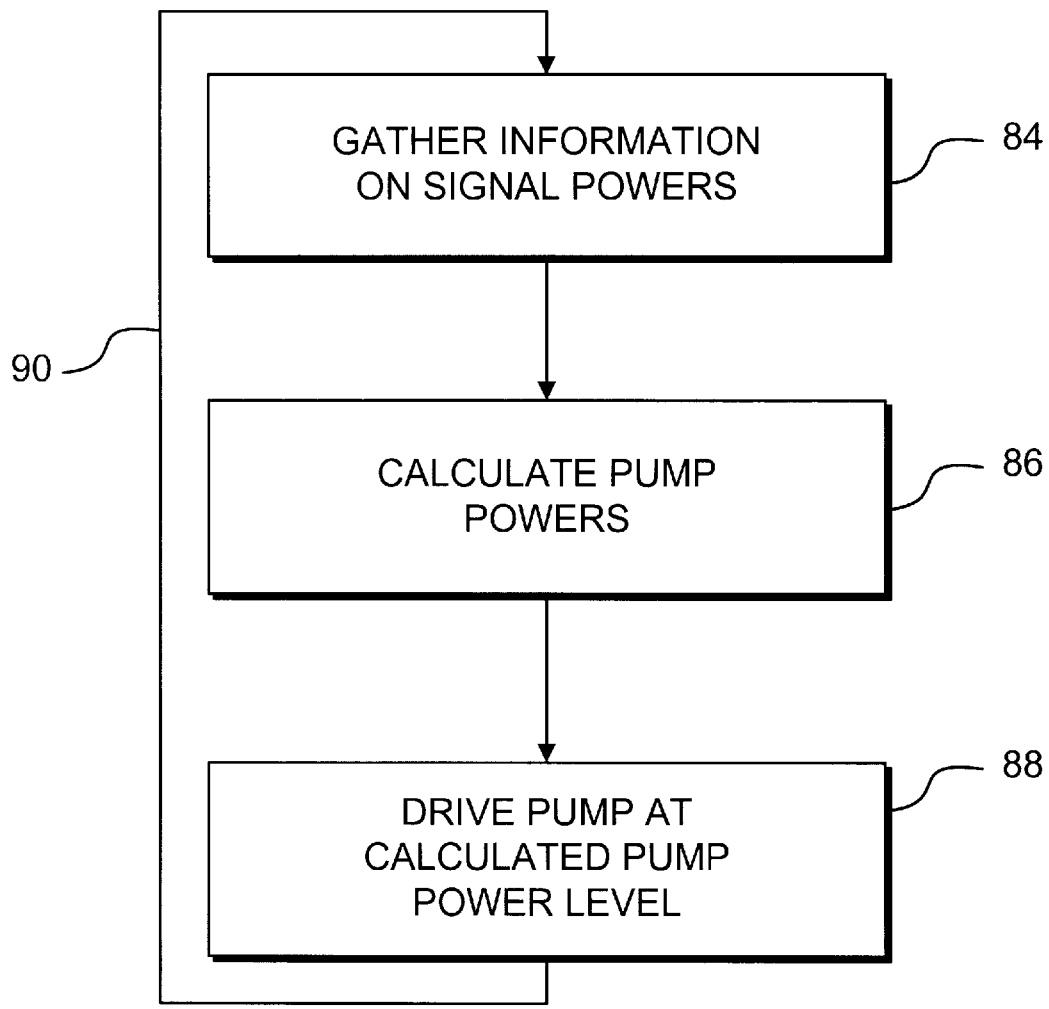
FIG. 10 is a flow chart of illustrative steps involved in using measured signal powers to controlling the pumping of distributed Raman amplifiers to reduce transient effects in accordance with the present invention.

Illustrative steps involved in controlling amplifier transients in an optical amplifier system including a distributed Raman amplifier using the control techniques described in connection with equations 1–7 are shown in FIGS. 9 and 10. The steps of FIG. 9 relate to making signal power measurements using monitoring circuitry and transmitting these measurements to other nodes using a telemetry channel. The steps of FIG. 10 relate to using local power measurements and information on measured signal powers that has been received over the telemetry channel to control pumps such as Raman pump 20.

At step 78 of FIG. 9, control unit 44 of equipment 26 measures signal powers. For example, input and output signal powers may be measured. Signals may be spectrally-filtered using spectrum filters, so that feed-forward and feedback control techniques may be used without introducing adverse wavelength-dependent effects. Although the use of taps, spectral filters, and monitoring circuitry above has been described primarily in the context of monitoring signal powers for the distributed Raman amplifiers in the system, these arrangement are also preferably used to measure signal powers in amplifier stage 18. Control unit 44 may control Raman pump 20 and erbium pumps 64 and 68 based on the measured signal powers.

At step 80, information on the measured signal powers is transmitted to other nodes in the system. For example, the control unit 44 at a given node i may transmit information on the signal powers measured at that node i to a subsequent node i+1 in communications link 10 using one or more telemetry channels or other suitable communications path such as a path formed by weakly modulating some or all of the data signals in the signal band at low frequencies, a wireless communications path, or a communications path formed using one or more electrical power supply lines in a fiber-optic cable, etc.

As shown by line 82, the steps of FIG. 9 may be performed in a continuous loop. For example, steps 78 and 80 may be performed once every 100 ns. The loop speed is determined by the capabilities of the control electronics. In general, the control electronics in the amplifier should be selected to operate as rapidly as possible within cost constraints.

The steps of FIG. 10 may be performed concurrently with the steps of FIG. 9. At step 84 of FIG. 10, the control unit 44 of node i+1 may gather information on the measured signal powers. For example, the control unit i+1 may locally gather information on the measured power $P_{IN}(i+1)$ at node i+1 from the input power monitor. Information on the measured signal powers in amplifier stage 18 at node i+1 may be gathered from the monitor circuits in amplifier stage 18 at node i+1. The control unit at node i+1 may also receive and process telemetry channel transmissions (or transmissions over other suitable communications paths) on the measured signal powers from node i such as the measured signal power $P_F(i)$.

At step 86, control unit 44 may used the measured signal power information to calculate the appropriate pump power for pump 20 as described in connection with equations 1–7. Control unit 44 may use feed-forward control techniques, feedback control techniques, hybrid control techniques, or any other suitable control techniques to calculate the pump power for pump 20. Control unit 44 may also calculate appropriate pump powers for the pumps in amplifier stage 18 using feed-forward control techniques, feedback control techniques, hybrid control techniques, or other suitable control techniques.

At step 88, control unit 44 may drive the pumps in the distributed Raman amplifier and amplifier stage 18 based on the pump levels calculated at step 64.

As shown by line 10, the steps of FIG. 10 may be performed in a continuous loop. For example, steps 84, 86, and 88 may be performed once every 100 ns. The loop speed is determined by the capabilities of the control electronics. In general, the control electronics in the amplifier should be selected to operate as rapidly as possible within cost constraints.

It will be understood that the foregoing is merely illustrative of the principles of this invention, and that various modifications can be made by those skilled in the art without departing from the scope and spirit of the invention. For example, the approaches described above may be used to control transients in distributed Raman systems in which the output power spectrum from a given node is not flat.

What is claimed is:

1. Equipment for a fiber-optic communications link having a plurality of nodes that are interconnected by a plurality of respective spans of optical fiber, comprising:

a Raman pump at each node for pumping a respective one of the fiber spans at a given pump power;

an amplifier stage at each node that amplifies optical signals on channels of different wavelengths that are transmitted along the fiber;

a tap at each node that taps the optical signals;

a monitor at each node that monitors the tapped optical signals at that node; and a control unit at each node that transmits information on the monitored optical signals to a subsequent node in the link, wherein the control unit at each node adjusts the Raman pump power at that node based on the information on the monitored optical signals received from a previous node in the link, wherein the equipment further comprises a spectrum filter at each node that spectrally filters only the tapped optical signals at that node, wherein the information on the monitored optical signals received from the previous node in the link includes information on the spectrally-filtered output power of the optical signals in the previous node, wherein the Raman pumps produce a Raman gain spectrum in the fiber spans and the spectrum filter has a spectrum that matches the Raman gain spectrum, and wherein the amplifier stage comprises optically-pumped erbium-doped fiber.

* * * * *